UNITED STATES PATENT OFFICE.

ARTHUR EICHENGRÜN, OF ELBERFELD, GERMANY, ASSIGNOR TO THE FARBENFABRIKEN OF ELBERFELD COMPANY, OF NEW YORK.

PHARMACEUTICAL COMPOUND AND PROCESS OF MAKING SAME.

SPECIFICATION forming part of Letters Patent No. 626,413, dated June 6, 1899.

Application filed February 17, 1899. Serial No. 705,791. (No specimens.)

*To all whom it may concern:*

Be it known that I, ARTHUR EICHENGRÜN, doctor of philosophy, chemist, of Elberfeld, Germany, (assignor to the FARBENFABRIKEN OF ELBERFELD COMPANY, of New York,) have invented a new and useful Improvement in Pharmaceutical Compounds; and I hereby declare the following to be a clear and exact description of my invention.

The reaction product which is obtained by the action of ichthyolsulfonic acid on albumen compounds cannot be used as a remedy for intestinal diseases, because it exhibits the intense and disagreeable taste and smell of ichthyol. I have now found that by heating the said product with formic aldehyde it is transformed into a new methylene derivative, which is a tasteless and odorless compound and which is, therefore, well adapted for use as an internal remedy.

In carrying out my new process practically I may proceed as follows: Twelve hundred and fifty grams of ichthyolsulfonic acid are stirred into a solution prepared from one kilo, by weight, of an albumen compound—say egg albumen—and ten liters of water. The resulting mixture is heated on a water-bath until a coagulated precipitate has separated at the bottom of the vessel. The liquid is then poured off and replaced by fresh water. Subsequently one hundred cubic centimeters of a ten-per-cent. formic-aldehyde solution are added, and the resulting mixture is heated on the water-bath to boiling. The precipitate is then filtered off, dried, and pulverized. Thus a grayish-yellow amorphous powder is obtained which is practically odorless and tasteless. It is insoluble in water, alcohol, ether, and benzene. By dilute acids it is not decomposed; but it is slowly dissolved by the action of dilute alkalies. Owing to these properties the new product can be employed with advantage as an internal remedy.

Having now described my invention and in what manner the same is to be performed, what I claim as new, and desire to secure by Letters Patent, is—

1. The process for producing a new pharmaceutical compound, which process consists in first heating the precipitate obtained by the action of ichthyolsulfonic acid on albumens with a formic-aldehyde solution, subsequently filtering and drying the new compound thus obtained, substantially as hereinbefore described.

2. As a new article of manufacture the new pharmaceutical compound obtainable from formic aldehyde, albumens and ichthyolsulfonic acid, which is a grayish-yellow, practically tasteless and odorless powder insoluble in water, alcohol, ether, benzene and in dilute acids, and which is slowly dissolved by the action of dilute alkalies, substantially as hereinbefore described.

In testimony whereof I have signed my name in the presence of two subscribing witnesses.

ARTHUR EICHENGRÜN.

Witnesses:
R. E. JAHN,
OTTO KÖNIG.

It is hereby certified that in Letters Patent No. 626,413, granted June 6, 1899, upon the application of Arthur Eichengrün, of Elberfeld, Germany, for an improvement in "Pharmaceutical Compounds and Processes of Making Same," an error appears in the printed specification requiring correction as follows: In line 32, the words "ten-per-cent" should read *forty-per-cent;* and that the said Letters Patent should be read with this correction therein that the same may conform to the record of the case in the Patent Office.

Signed, countersigned, and sealed this 20th day of June, A. D., 1899.

[SEAL.]

WEBSTER DAVIS,
*Assistant Secretary of the Interior.*

Countersigned:
    C. H. DUELL,
        *Commissioner of Patents.*